United States Patent
Cai et al.

(10) Patent No.: US 8,722,263 B2
(45) Date of Patent: May 13, 2014

(54) FEEDBACK CONTROL OF H2 INJECTION DURING PARK BASED ON GAS CONCENTRATION MODEL

(75) Inventors: Jun Cai, Rochester, NY (US); Joseph Nicholas Lovria, Honeoye Falls, NY (US); Sriram Ganapathy, Rochester, NY (US); Jaehak Jung, Pittsford, NY (US); John P. Salvador, Penfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 789 days.

(21) Appl. No.: 12/754,279

(22) Filed: Apr. 5, 2010

(65) Prior Publication Data
US 2011/0244348 A1   Oct. 6, 2011

(51) Int. Cl.
*H01M 8/04* (2006.01)
(52) U.S. Cl.
USPC .......................................... 429/429; 429/428

(58) Field of Classification Search
None
See application file for complete search history.

(56) References Cited

U.S. PATENT DOCUMENTS 8,232,014 B2   7/2012   Arthur

*Primary Examiner* — Yoshitoshi Takeuchi
(74) *Attorney, Agent, or Firm* — John A. Miller; Miller IP Group, PLC

(57) ABSTRACT

A method for determining when to inject hydrogen gas into the anode side of a fuel cell stack associated with a fuel cell vehicle when the vehicle is off. The method includes estimating the concentration of hydrogen gas in the anode side of the fuel cell stack using a gas concentration model and determining if the estimated concentration of hydrogen gas is below a first predetermined threshold. If the estimated hydrogen gas is less than the threshold, then hydrogen gas is injected into the anode side from a hydrogen source. While the hydrogen gas is being injected, the method compares the estimated concentration of the hydrogen gas in the anode side to a desired concentration, and generates an error signal there between. If the error signal is greater than a second predetermined threshold, the algorithm continues to inject the hydrogen into the anode side of the fuel cell stack.

20 Claims, 2 Drawing Sheets

FEEDBACK CONTROL OF H2 INJECTION DURING PARK BASED ON GAS CONCENTRATION MODEL

BACKGROUND OF THE INVENTION

1. Field of the Invention

This invention relates generally to a system and method for determining when to inject hydrogen into an anode side of a fuel cell stack and, more particularly, to a system and method for determining when to inject hydrogen into an anode side of a fuel cell stack associated with a fuel cell vehicle when the vehicle is off, where the system and method determine when to inject the hydrogen based on a hydrogen gas concentration model and associated injector algorithm.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant humidity diffusion. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. The fuel cell stack also receives an anode hydrogen input gas that flows into the anode side of the stack. Not all of the oxygen is consumed by the stack and some of the air is output as a cathode exhaust gas that may include water as a by-product of the chemical reaction taking place in the stack.

The fuel cell stack includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows. In automotive applications, there are a large number of start and stop cycles over the life of the vehicle and the life of the fuel cell system, each of which may generate an air/hydrogen front as described above.

An average vehicle can experience 40,000 startup/shut-down cycles over its useful life. Start and stop cycles are damaging to the fuel cell system due to the potential which may be generated by an air/hydrogen front, discussed below and the best demonstrated mitigation of damage still causes approximately 2 to 5 $\mu V$ of degradation per start and stop cycle. Thus, the total degradation over the 40,000 start and stop cycle events can exceed 100 mV. However, by not allowing air to enter the fuel cell stack while the fuel cell system is shut down, damage during subsequent restarts may be reduced or prevented.

When a fuel cell system is shut down, unreacted hydrogen gas remains in the anode side of the fuel cell stack. This hydrogen gas is able to diffuse through or cross over the membrane and react with the oxygen in the cathode side. As the hydrogen gas diffuses to the cathode side, the total pressure on the anode side of the stack is reduced, where it is possible to reduce the pressure below ambient pressure. This pressure differential can draw air from ambient into the anode side of the stack. It is also possible for air to enter the anode by diffusion from the cathode. When the air enters the anode side of the stack it can generate air/hydrogen fronts that create a short circuit in the anode side, resulting in a lateral flow of hydrogen ions from the hydrogen flooded portion of the anode side to the air-flooded portion of the anode side. This current combined with the high lateral ionic resistance of the membrane produces a significant lateral potential drop (~0.5 V) across the membrane. This produces a local high potential between the cathode side opposite the air-filled portion of the anode side and adjacent to the electrolyte membrane that drives rapid carbon corrosion, and causes the electrode carbon layer to get thinner. This decreases the support for the catalyst particles, which decreases the performance of the fuel cell.

When the fuel cell system is shut down, the gas permeation continues through the membrane until the gas component partial pressures have equalized on both sides of the membrane. The diffusivity of hydrogen through the membrane from the anode to the cathode is approximately three times the rate of nitrogen from the cathode to the anode. Higher hydrogen diffusivity rates equate to a rapid equalization of hydrogen partial pressures compared to a relatively slow equalization of nitrogen partial pressure. The difference in gas diffusivities causes the anode sub-system absolute pressure to drop until the cathode hydrogen partial pressure reaches the anode hydrogen partial pressure. Typically, the anode side of the fuel cell stack is operated at a high hydrogen concentration, such as greater than 60%, and large volumes of hydrogen-rich gas exist in the anode headers and anode plumbing outside of the anode of the stack. As the anode absolute pressure drops, more hydrogen is drawn out of the anode sub-system into the anode flow field of the stack.

The net result of the hydrogen partial pressure equalization after system shut-down is an increase in the concentration of hydrogen in the cathode side of the fuel cell stack with time, at least for some period of time after shut-down. At system start-up, the compressor is started, but the concentration of hydrogen exiting the fuel cell stack from the cathode must be limited so as to not violate emission requirements. Thus, as the cathode of the fuel cell is filled with fresh air, the hydrogen rich gas leaving the cathode side of the stack must be diluted. To meet start-time and noise requirements, there is a need to optimize the fill time of the stack cathode. Because the cathode flow is limited by the power available to the compressor, the fill method must be robust to changes in total compressor flow rate.

At system start-up, assuming enough time has gone by since the previous shut-down, most of the hydrogen remaining in the stack from the last shut-down has diffused out of the stack and both the cathode and anode flow channels are generally filled with air. When hydrogen gas is introduced into the anode flow channels at system start-up, the hydrogen gas pushes the air out of the anode flow channels creating a hydrogen/air front that travels through the anode flow channels. The presence of the hydrogen/air front on the anode side combined with air on the cathode side causes a series of electrochemical reactions to occur that result in the consumption of the carbon support on the cathode side of the MEA, thereby reducing the life of the MEAs in the fuel cell stack. For example, it has been shown that without addressing the degradation effects of the hydrogen/air front at system start-up, it is possible for about 100 shut-down and start-up cycles to destroy the fuel cell stack in this manner.

One known technique for significantly reducing the air/hydrogen front at system start-up, and thus, reducing catalytic corrosion is to reduce the frequency of start-ups in which the anode and cathode are filled with air. One strategy to achieve this is to leave the anode and cathode in a nitrogen/hydrogen environment. However, the hydrogen will eventually either diffuse out of the anode, or be consumed by oxygen slowly returning to the stack. Thus, in order to extend the ability to reduce catalytic corrosion, hydrogen can be periodically injected into the stack while the system is in the shut-down condition. Because mostly nitrogen is remaining in the cathode side at system shut-down, as the result of the oxygen being consumed by the fuel cell reaction, nitrogen and hydrogen are the main elements that are equalized in the cathode and anode sides of the fuel cell stack after system shut-down. Any oxygen that might diffuse into the cathode via the plumbing will be consumed by excess hydrogen, delaying oxygen accumulation in the cathode and anode. This delay will typically prevent a damaging air/hydrogen front.

It is desirable to predict or estimate the amount of hydrogen in the anode and cathode of a fuel cell system during system start-up to allow the start-up strategy to meet the emissions requirements while maximizing reliability and minimizing start time. It is generally desirable that the hydrogen concentration estimator be robust to shut-down and off time related functions and account for membrane permeation of gases as well as air intrusion from external sources. At the same time, the estimation algorithm must be simple enough to be provided in an automotive controller with the calculation sufficiently minimal so as to be completed without delaying the start-up.

Determining the hydrogen concentration in the anode and cathode of the fuel cell stack at start-up will allow the fastest possible start time because the system control does not need to provide excess dilution air when unnecessary. Further, knowing the hydrogen concentration provides a more reliable start because the amount of hydrogen in the anode that needs to be replenished will be known. This is especially relevant for start-ups from a stand-by state, or from the middle of a shut-down, where hydrogen concentrations can be relatively high.

Further, knowing the hydrogen concentration improves durability because when there is an unknown hydrogen concentration in the stack, typical start-up strategies might need to assume the worst case percentage of hydrogen for injection purposes and 100% hydrogen for dilution purposes. In those situations, the initial anode flush with hydrogen could be slower than if the stack is known to be filled with air. The rate of corrosion is proportional to the initial hydrogen flow rate when the stack is air-filled. Therefore, without accurately knowing the hydrogen concentration, each of these events could be more damaging than necessary.

Also, knowing the hydrogen concentration provides improved efficiency because a more accurate determination of hydrogen concentration in the anode and cathode prior to start-up will lead to more effective start-up decisions and potential reduction in hydrogen use. For example, dilution air flow rates could be lowered if it is known that the stack is starting with no hydrogen in it. Further, knowing the hydrogen concentration provides more robust start-ups. In the event of a premature shut-down or a shut-down with a failed sensor, the algorithm can use physical limits to provide an upper and lower bound on the hydrogen in the cathode and anode.

The determination of when to make the hydrogen injection into the anode side of the fuel cell stack in the existing systems when the system is off is typically based on time. Particularly, the fuel cell system controller wakes up based on a fixed schedule, and each time the controller wakes up it compares the time from the last wake-up with a hydrogen injection schedule. If the time that the controller has been off exceeds the scheduled injection time, then the hydrogen injection is performed. Typically, the injection schedule is empirically determined by a look-up table, which is modified by the physical parameters of the stack, such as pressure, temperature, etc., captured from the last successful system shut-down. The injected hydrogen is pressure controlled and the injection ends when the stack pressure exceeds a calibrated threshold.

The technique for determining when to provide the hydrogen injection described above has a number of limitations. Particularly, each fuel cell system is different and has different component variations. Further, system operation changes as the fuel cell stack ages. Also, ambient conditions affect the operation of the fuel cell system. Further, leaks in the anode sub-system determine how fast the hydrogen gas is removed from the anode. Also, due to the fact that pressure is not an indication of hydrogen concentration, the hydrogen concentration could vary at each pressure-controlled injection. Therefore, the time schedule that may be used for one system for determining hydrogen gas injection may not be applicable to another fuel cell system—since the hydrogen gas in one system may be below a predetermined threshold, such as 15%, before the next injection is scheduled.

U.S. provisional Patent Application Ser. No. 61/250,429, filed Oct. 9, 2009, titled Hydrogen Concentration Estimation in Fuel Cell Systems at Shut Down and Start Up, discloses a system and method for estimating the amount of hydrogen in a fuel cell stack. The method defines the fuel cell stack and stack volumes as discrete volumes including an anode flow-field and anode plumbing volume, a cathode flow-field volume and a cathode header and plumbing volume. The method estimates the amount of hydrogen and/or nitrogen in the anode flow-field and anode plumbing volume, the cathode flow-field volume and the cathode header and plumbing volume when the fuel cell system is shut down. The method also estimates the amount of hydrogen and/or nitrogen in the anode flow-field and anode plumbing volume, the amount of hydrogen in the cathode flow-field volume and the amount of hydrogen in the cathode header and plumbing volume at system start-up. These values are estimated based on assumptions regarding hydrogen, nitrogen, humidity and oxygen movement via diffusion, convection, leakage, and membrane permeation.

SUMMARY OF THE INVENTION

In accordance with the teachings of the present invention, a system and method are disclosed for determining when to inject hydrogen gas into the anode side of a fuel cell stack associated with a fuel cell vehicle when the vehicle is off, where the determination is based on a gas concentration model. The method includes estimating the concentration of hydrogen gas in the anode side of the fuel cell stack using the gas concentration model and determining if the estimated concentration of hydrogen gas is below a first predetermined threshold. If the estimated hydrogen gas is less than the threshold, then hydrogen gas is injected into the anode side from a hydrogen source. While the hydrogen gas is being injected, the method compares the estimated concentration of the hydrogen gas in the anode side to a desired concentration, and generates an error signal there between. If the error signal is greater than a second predetermined threshold, the algorithm continues to inject the hydrogen into the anode side of the fuel cell stack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining when to provide hydrogen gas injections into the anode side of a fuel cell stack associated with a fuel cell vehicle when the vehicle is off using a gas concentration model is merely exemplary in nature, and is in no way intended to limit the invention or its applications or uses.

Figure 1:
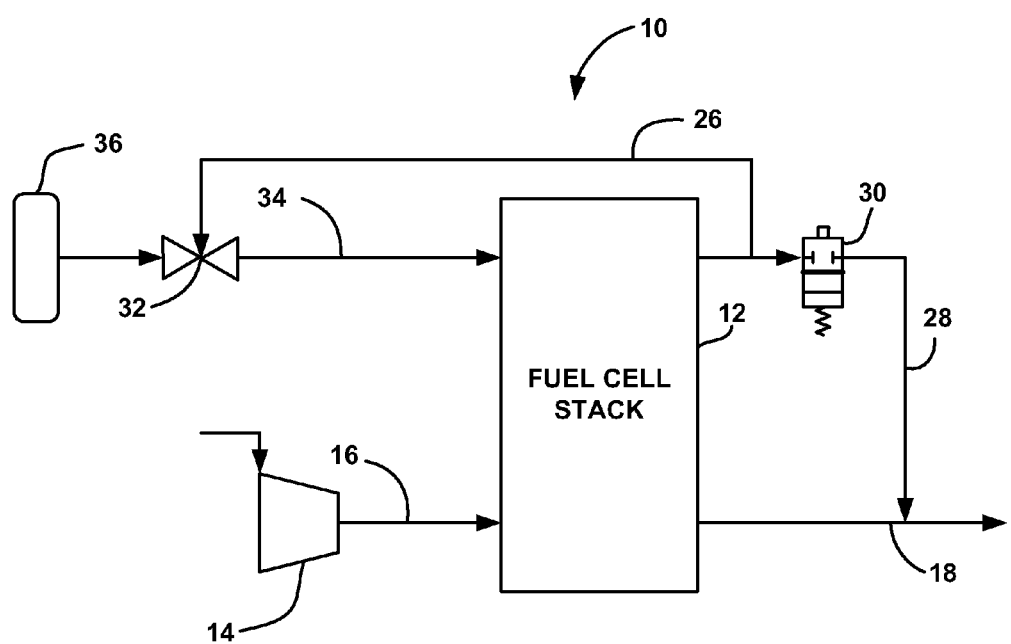
FIG. 1 is a schematic block diagram of a fuel cell system.

FIG. 1 is a plan view of a fuel cell system 10 including a fuel cell stack 12. A compressor 14 provides compressed air to the cathode side of the fuel cell stack 12 on a cathode input line 16. A cathode exhaust gas is output from the fuel cell stack 12 on a cathode exhaust gas line 18. An injector 32 injects hydrogen gas from a hydrogen source 36, such as a high pressure tank, into the anode side of the fuel cell stack 12 on an anode input line 34. The anode exhaust gas from the fuel cell stack 12 is recirculated back to the injector 32 on a recirculation line 26. As is well understood in the art, it is periodically necessary to bleed the anode exhaust gas to remove nitrogen from the anode side of the stack 12. A bleed valve 30 is provided in an anode exhaust line 28 for this purpose, where the bled anode exhaust gas is combined with the cathode exhaust gas on the line 18 to dilute hydrogen gas within the anode exhaust gas to be below combustible and/or emissions limits.

As will be discussed in detail below, the present invention employs a gas concentration model (GCM) of the type known in the art, such as that disclosed in the '429 application, to determine when to provide a hydrogen gas injection into the anode side of the fuel cell stack 12 when the system 10 is in a shut-down condition. The hydrogen gas is injected into the anode side of the fuel cell stack 12 during the shut-down condition at a desired time to attempt to minimize the hydrogen/air front that may occur in the fuel cell stack 12 consistent with the discussion above.

Figure 2:
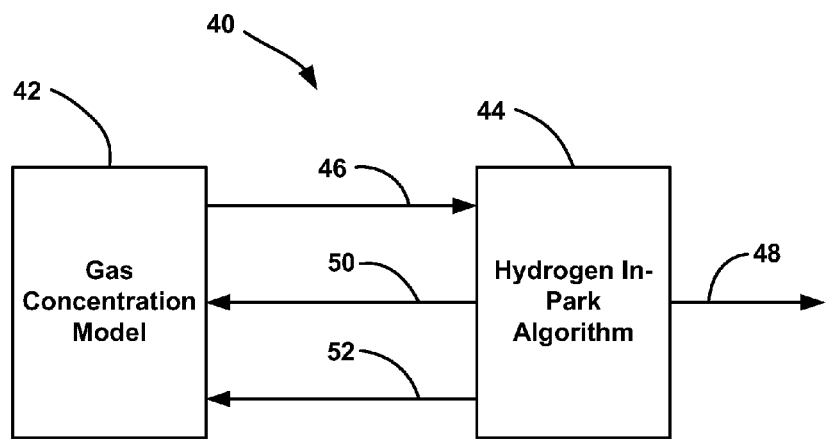
FIG. 2 is a block diagram showing a signal exchange between a gas concentration module and an injection algorithm that determines when to provide hydrogen gas injections.

FIG. 2 is a block diagram of a system 40 showing a general overview of such a design. The system 40 includes a gas concentration model block 42 and a hydrogen in-park algorithm block 54. The gas concentration model determines the concentration of hydrogen gas in the anode sub-system, typically as a mole fraction, and provides that concentration estimation on line 46 to the algorithm box 44 as signal molFr_AnH2Est. The algorithm determines whether the concentration of hydrogen gas in the anode sub-system is less than a predetermined threshold percentage, such as 5%, and if so, initiates the hydrogen gas injection by providing an injector duty cycle signal DC_AnInj to the injector 32 on line 48. When the injection sequence has been initiated, the algorithm provides an injection start signal b_H2InParkStrt on line 50 and a hydrogen injection activated signal b_H2InParkActv on line 52 when the injection is occurring to the gas concentration model so that the hydrogen gas concentration in the anode sub-system can be updated during the injection based on the duty cycle signal DC_AnInj.

Figure 3:
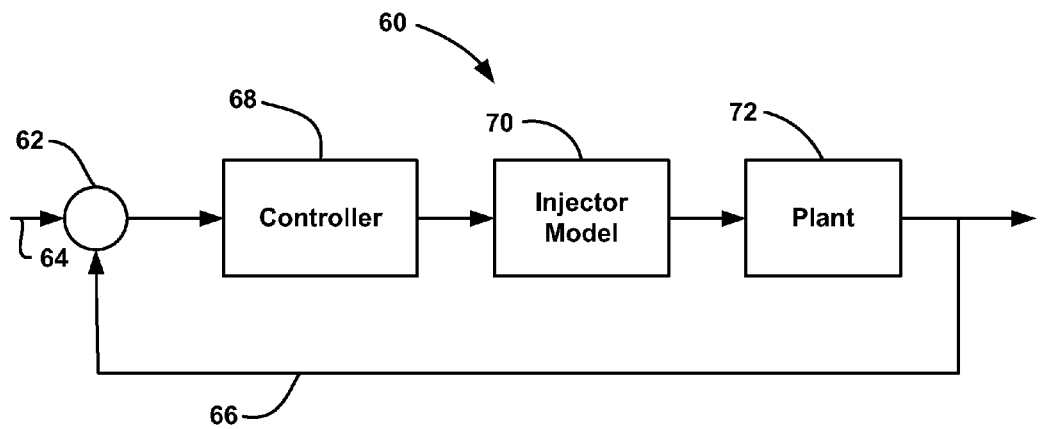
FIG. 3 is a block diagram of a system showing feedback control of hydrogen injection based on a gas concentration model.

FIG. 3 is a block diagram of a control architecture 60 for controlling the injection of the hydrogen gas during the vehicle off condition once it has been triggered. The architecture 60 includes a summation junction 62 that receives a desired concentration of hydrogen gas signal $r_{H_2}^{Dsrd}$ that identifies the desired amount of hydrogen to be injected into the anode on line 64 and a current estimated hydrogen gas concentration signal $r_{H_2}^{Est}$ that is determined by the gas concentration model on feedback line 66. The estimated hydrogen concentration value $r_{H_2}^{Est}$ is the mole fraction signal molFr_AnH2Est referred to above. The difference or error between the desired concentration value $r_{H_2}^{Dsrd}$ and the estimated concentration value $r_{H_2}^{Est}$ from the summation junction 62 is provided to a proportional-integral (PI) controller 68 that determines if the error is greater than a predetermined threshold, and if so, how much more hydrogen gas should be injected into the anode sub-system to reduce the error below the threshold. When the error drops below the threshold, then the hydrogen injection is terminated because the estimation hydrogen concentration value $r_{H_2}^{Est}$ is the same or approximately the same as the desired hydrogen concentration value $r_{H_2}^{Dsrd}$. In this embodiment, the PI controller 68 provides a quantity set-point $\dot{n}_{H_2}^{SP}$, such as molar flow, mass flow, moles per second, grams per second, etc., as the amount of hydrogen that further needs to be provided to the anode sub-system during the injection. Although the controller 68 is a PI controller in this embodiment, this is by way of a non-limiting example in that other types of controllers, such as a bang-bang controller, a feed-forward controller, etc., may also be applicable.

In the discussion above, the process injects hydrogen gas, continuously integrates the hydrogen gas concentration, and stops the injection when a desired hydrogen gas concentration is reached. This process includes having an initial hydrogen gas concentration and a final hydrogen gas concentration set-point. Using the ideal gas law, which would need to be used in either case, the total grams of hydrogen gas can be estimated, which needs to be added. Then, this amount of hydrogen gas could be added by an integrator in the injector. Alternatively, this could be provided by using a pressure rise, which directly relates to the additional grams of hydrogen gas. Thus, instead of estimating the amount of hydrogen gas, the pressure could be measured to determine the hydrogen gas flow through the injector.

The set-point value $\dot{n}_{H_2}^{Sp}$ is provided to an injector model processor 70 that determines the duty cycle of the injector 32 based on an injector model. In other words, the injector model determines the injector pulse duration and frequency to achieve the desired set-point value $\dot{n}_{H_2}^{Sp}$. The injector model converts the set-point value $\dot{n}_{H_2}^{Sp}$ to a duty cycle signal $DC_{Inj}$ that is applied to a plant box 72, which represents the fuel cell system, and provides the estimated hydrogen concentration value $r_{H_2}^{Est}$ in the anode sub-system. Thus, the architecture 60 determines when to provide the injected hydrogen when the fuel cell system controller wakes up, and for how long.

The benefits of using the concentration-based injection control discussed above over the known time-based injection control include performing the injection only when the hydrogen concentration is below some minimum threshold. For example, in the sixth hour after system shut-down, the hydrogen concentration may be 15%, where the concentration-based control of the invention would not perform an injection. Instead, the concentration-based injection control would wait for a future fuel cell system controller wake-up, where the concentration of the hydrogen gas in the anode sub-system may be much lower. The time-based injection control may wake up the controller and perform an injection regardless of the hydrogen concentration. Thus, the concentration-based injection control of the invention not only helps save fuel and battery consumption, but also impacts the start-up time and emissions on the next start-up. Further, because of the hydrogen concentration feedback, the concentration-based injection control ensures that the anode hydrogen concentration reaches the same level after injection regardless of the initial hydrogen concentration. For the time-based injection that relies on pressure to terminate the injection, the anode hydrogen concentration at the completion of the injection could vary.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining when to inject hydrogen gas into an anode of a fuel cell system when the system is shut-down, said method comprising:
   using a controller for estimating the concentration of hydrogen gas in the anode;
   using the controller for determining that the estimated concentration of hydrogen gas in the anode is below a predetermined threshold; and
   causing hydrogen gas to be injected into the anode from a hydrogen source while the fuel cell system is shut-down when the estimated concentration of the hydrogen gas in the anode is less than the threshold.

2. The method according to claim 1 wherein estimating the concentration of hydrogen gas in the anode includes using a gas concentration model.

3. The method according to claim 2 further comprising providing an injection start time signal and an injection active time signal to the gas concentration model to determine the concentration of hydrogen gas in the anode during the injection of hydrogen gas.

4. The method according to claim 1 wherein causing hydrogen gas to be injected into the anode includes calculating a duty cycle of an injector and operating the injector at the duty cycle to inject the hydrogen gas.

5. The method according to claim 4 further comprising determining an error between the desired amount of hydrogen gas in the anode and the estimated amount of hydrogen gas in the anode and providing a hydrogen molar flow set-point from the error to control the amount of hydrogen gas that is injected.

6. The method according to claim 1 further comprising determining when to end the injection of hydrogen gas into the anode by comparing a desired hydrogen gas concentration and the estimated hydrogen concentration to determine whether the difference between the desired concentration and the estimated concentration is greater than a predetermined threshold.

7. The method according to claim 1 wherein estimating the concentration of hydrogen gas in the anode includes estimating the concentration of hydrogen gas as a molar flow rate.

8. The method according to claim 1 wherein the fuel cell system is on a vehicle and the method causes the hydrogen gas to be injected into the anode while the vehicle is off.

9. The method according to claim 1 wherein the method is performed when a fuel cell system controller wakes up based on a predetermined wake up schedule.

10. A method for determining when to inject hydrogen gas into an anode of a fuel cell system when the system is shut down, said method comprising:
    using a controller for estimating the concentration of hydrogen gas in the anode using a gas concentration model;
    using the controller for determining whether the estimated concentration of hydrogen gas is below a first predetermined threshold;
    causing hydrogen gas to be injected into the anode from a hydrogen source while the fuel cell system is shut-down when the estimated concentration of the hydrogen gas in the anode is less than the first threshold;
    comparing the estimated concentration of the hydrogen gas to a desired concentration of hydrogen gas and generating an error signal therebetween;
    determining that the error signal is greater than a second predetermined threshold;
    converting the error signal to a set-point value;
    converting the molar flow set-point value to an injector duty cycle value using an injector model; and
    ending the injection of the hydrogen gas when the error signal falls below the second predetermined threshold.

11. The method according to claim 10 further comprising providing an injection start time signal and an injection active time signal to the gas concentration model to determine the concentration of hydrogen gas in the anode during the injection of hydrogen gas.

12. The method according to claim 10 wherein the method is performed when a fuel cell system controller wakes up based on a predetermined wake up schedule.

13. A system for determining when to inject hydrogen gas into and anode of a fuel cell system when the system is shut-down, said system comprising:
    means for estimating the concentration of hydrogen gas in the anode;

means for determining that the estimated concentration of hydrogen gas in the anode is below a predetermined threshold; and means for causing hydrogen gas to be injected into the anode from a hydrogen source while the fuel cell system is shut-down when the estimated concentration of the hydrogen gas in the anode is less that the threshold.

14. The system according to claim 13 wherein the means for estimating the concentration of hydrogen gas in the anode includes uses a gas concentration model.

15. The system according to claim 14 further comprising means for providing an injection start time signal and an injection active time signal to the gas concentration model to determine the concentration of hydrogen gas in the anode during the injection of hydrogen gas.

16. The system according to claim 13 wherein the means for causing hydrogen gas to be injected into the anode calculates a duty cycle of an injector and operating the injector at the duty cycle to inject the hydrogen gas.

17. The system according to claim 16 further comprising means for determining an error between the desired amount of hydrogen gas in the anode and the estimated amount of hydrogen gas in the anode and providing a hydrogen molar flow set-point from the error to control the amount of hydrogen gas that is injected.

18. The system according to claim 13 further comprising means for determining when to end the injection of hydrogen gas into the anode by comparing a desired hydrogen gas concentration and the estimated hydrogen concentration to determine whether the difference between the desired concentration and the estimated concentration is greater than a predetermined threshold.

19. The system according to claim 13 wherein the means for estimating the concentration of hydrogen gas in the anode estimates the concentration of hydrogen gas as a molar flow rate.

20. The system according to claim 13 wherein the fuel cell system is on a vehicle and the system causes the hydrogen gas to being injected into the anode while the vehicle is off.

* * * * *